United States Patent [19]

Lesnick et al.

[11] Patent Number: 4,760,606

[45] Date of Patent: Jul. 26, 1988

[54] DIGITAL IMAGING FILE PROCESSING SYSTEM

[75] Inventors: Edward Lesnick, Carlisle; Bruce R. Silver, Weston, both of Mass.

[73] Assignee: Wang Laboratories, Inc., Lowell, Mass.

[21] Appl. No.: 880,409

[22] Filed: Jun. 30, 1986

[51] Int. Cl.$^4$ .............................................. G06K 9/20
[52] U.S. Cl. ........................................ 382/48; 382/61
[58] Field of Search ................................... 382/48, 61

[56] References Cited

U.S. PATENT DOCUMENTS

| 4,021,777 | 5/1977 | Shepard | 382/61 |
| 4,538,182 | 8/1985 | Saito et al. | 382/61 |
| 4,553,261 | 11/1985 | Froessl | 382/61 |

OTHER PUBLICATIONS

"Document Format Selection and Control Process"; IBM Technical Disclosure Bulletin; vol. 26, No. 9, (Feb. 84), by Aden et al.; pp. 4718–4719.

*Primary Examiner*—James J. Groody
*Assistant Examiner*—Michael D. Parker
*Attorney, Agent, or Firm*—Michael H. Shanahan; Scott K. Peterson

[57] ABSTRACT

A digital imaging file processing system for processing and filing digitized documents is disclosed. In the preferred embodiment a distributed data processing system implements the invention and is comprised of a central computer linked to the following components: a document processor; optical character recognition device; mass storage devices; a printer; and at least one intelligent workstation computer. The document processor automatically digitizes a stack of documents without the need for user intervention. A unique header page is used in each group of documents to be digitized, and gives the document processor such pertinent information as the scanning resolution, whether the processor is to look for yellow highlight marks, and the copy quality of the documents in the batch. Other information includes instructions per the use or non-use of the optical character recognition device, and filing or indexing instructions. A unique yellow highlight mark detection method and means are disclosed. The method comprises illuminating the documents to be processed with light of different wavelengths and comparing the reflected output in volts. The highlight marks can be used to identify the title of a document as well as key words therein, and the location within the document of the highlighted regions. The digitized documents can be classified by title, key words or other methods.

13 Claims, 8 Drawing Sheets

DIGITAL IMAGING FILE PROCESSING SYSTEM

BACKGROUND OF THE INVENTION

This invention relates generally to digital imaging systems. More specifically, the present invention relates to a method and apparatus for increasing automation and document classifying ability of such systems.

In the typical digital imaging system a specimen (or document) is illuminated and then scanned at every pixel to obtain analog reflectivity values. The analog reflectivity values are converted to a multi-digital number by an analog-to-digital converter, where the multi-digital number ranges from a minimum value representing the darkest state possible for the pixel, decimal number 0 for example, to a maximum value representing the lightest state possible for the pixel, decimal number 63 for example.

The multi-digit number representing the reflectivity of the pixel is compared to a threshold value (sometimes dynamic), so that the final digitized picture is represented by a single binary digit for each pixel. Stated differently, each pixel in the final digitized picture is stored or displayed in either an "ON" state or an "OFF" state. In comparing the multi-digit number to the threshold value the resulting pixel value is obtained as follows: if the multi-digit value exceeds the threshold value the pixel is determined to be in the "ON" state; if the multi-digit value equals or is less that the threshold value the pixel is determined to be in the "OFF" state.

SUMMARY OF THE INVENTION

Accordingly, it is a principal object of this invention to provide an efficient means of digitizing multiple specimens (or documents).

Also, it is an object of this invention to greatly reduce the need for user dependency, and thus increase automation, during the digitizing process.

Further, it is an object of this invention is to efficiently classify and file the digitized documents.

Another object of this invention is to efficiently provide text versions of the above-mentioned digital images.

Yet another object of this invention is to provide a means for automatically detecting highlight marks, such as marks made by a felt-tip pen intended to prominently display alphanumeric characters within the borders of the marks, on the specimens.

Additionally, it is an object of the present invention to respond to specially shaped highlight marks which indicate predetermined portions of the specimens.

Still another object of this invention is a means for identifying the memory locations of the input documents by recognition of highlighted data.

A further object of this invention is to provide a means for placing identification indicia at various locations of an already digitized document.

The foregoing and other objects of the present invention are realized by using a "smart scanner" device, which automatically feeds a stack of input documents past its scanning apparatus, including a charge-coupled device (CCD) array. The smart scanner identifies highlighted data from the input documents and attaches special significance to highlight marks of predetermined shapes. A scanner server (software module) is employed to control the smart scanner as well as send the image to an image file. The image is sent to an optical character recognition (OCR) device, controlled by its OCR server module. The OCR converts the image data into text data and stores it in a text file. An application module controls the flow of image and text data as well as the assignment of file names and memory destinations to each document.

DESCRIPTION OF THE DRAWINGS

The foregoing and other objects and features of the present invention are apparent from the specification, the drawings and the two taken together. The drawings are.

DETAILED DESCRIPTION

Figure 1:
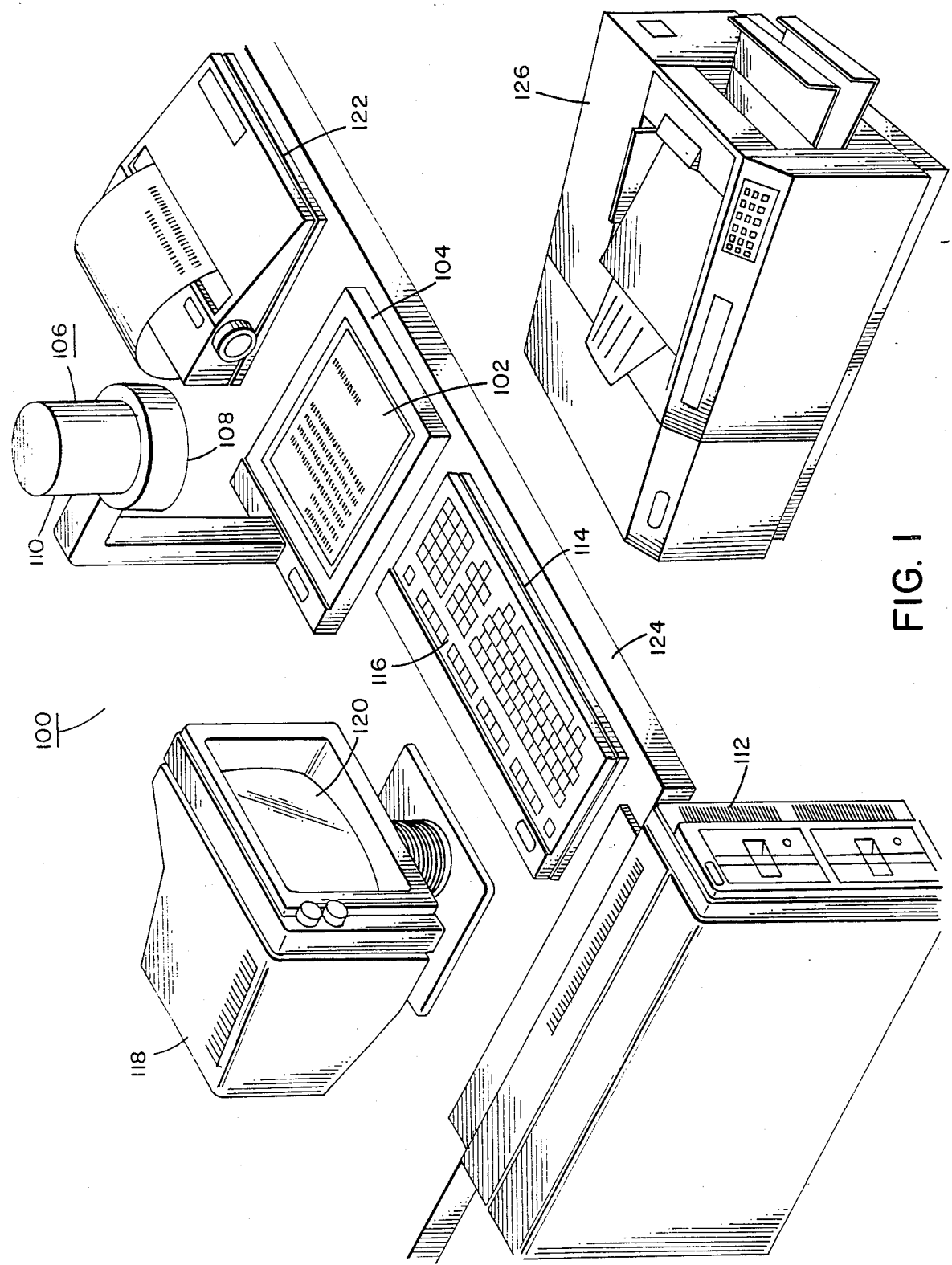
FIG. 1 is an isometric drawing of an example of a digital imaging system, including a document processor, such as may be used in conjunction with the present invention.

FIG. 1 shows a digital imaging system 100 used create digital images of a document 102 on a document mount 104. The illustrated system is the PIC system of Wang Laboratories, Inc., the present assignee of the invention herein. The document or specimen 102 may be a picture, chart, graph, text page or other image.

The specimen 102 is scanned on a line-by-line basis by a scanner or signal providing means 106 above the document. The primary components of the scanner 106 are a lamp or specimen illuminator 108, and a camera 110.

The specimen illuminator 108 illuminates the specimen 102 by causing light to be projected onto the specimen 102 in such a manner that the projected light is reflected from the specimen 102. Opaque documents 102 reflect the scanner light from their surfaces, while translucent or transparent documents 102 reflect the light with the aid of the specimen mount 104.

The reflected light from the specimen 102 is captured by the camera 110. A charge-coupled device (CCD) having a linear array of photoresponsive cells as is well known in the prior art, is included in the camera 110 to produce analog signals at each pixel location within a two-dimensional array of pixels which are proportionate to the pixel reflectivity. The CCD array within the camera 110 is mechanically displaced orthogonally to its linear array to effect a full two dimensional scan of the specimen 102. The camera 110 contains circuitry for effecting a conversion of the analog signals to multi-digital numbers representing the reflectivity of each pixel of the document 102. The camera 110 can be a high speed, full frame TV camera, such as is commercially available.

Alternate embodiments for the scanning process are possible. For example, the specimen 102 may be transparent, such as microfiche, and the specimen illuminator 108 might, instead of causing most of the light to be reflected from the specimen 102, shine light through the specimen 102. The camera 110 would be located strategically to capture the transmitted light, and the signals received from the camera 110 would be a measure of the transmissivity of the specimen 102 rather than the reflectivity.

At the heart of the system 100 is the computer console 112. In the present embodiment the console 112 contains the central processing unit (CPU), memory to store the digital images and other data, as well as program instructions to direct the operation of the separate components of the digital imaging system 100.

The user initiates and ultimately controls the operation of the digital imaging system 100 from the keyboard 114. Special function keys 116 are provided for sending special instructions to the system 100 during the digital imaging process.

A monitor 118 is included in the system 100. The monitor 118 contains components, including a screen or cathode ray tube (CRT), necessary to display images from the specimens 102 either directly from the output of the digitizing process or from other memory after the digitizing process has taken place and been stored.

The present invention includes a document processor or scanner means 126 for automatic scanning and processing of a stack of documents. The document processor 126 combines the features of the scanner 106 and some of the functions performed by the console 112, although the console 112 may control the overall operation of the digital imaging system 100. The document processor 126 may also be connected to another computer system through networking. Many documents can be more efficiently digitized without the need for user intervention using the document processor 126 rather than the scanner 106. Thus, the present invention anticipates that most of the digitization will occur using the document processor 126. The scanner 106 is still needed to scan documents which either cannot fit into the document processor 126 or are unsuitable for feeding into the document processor 126.

Figure 2:
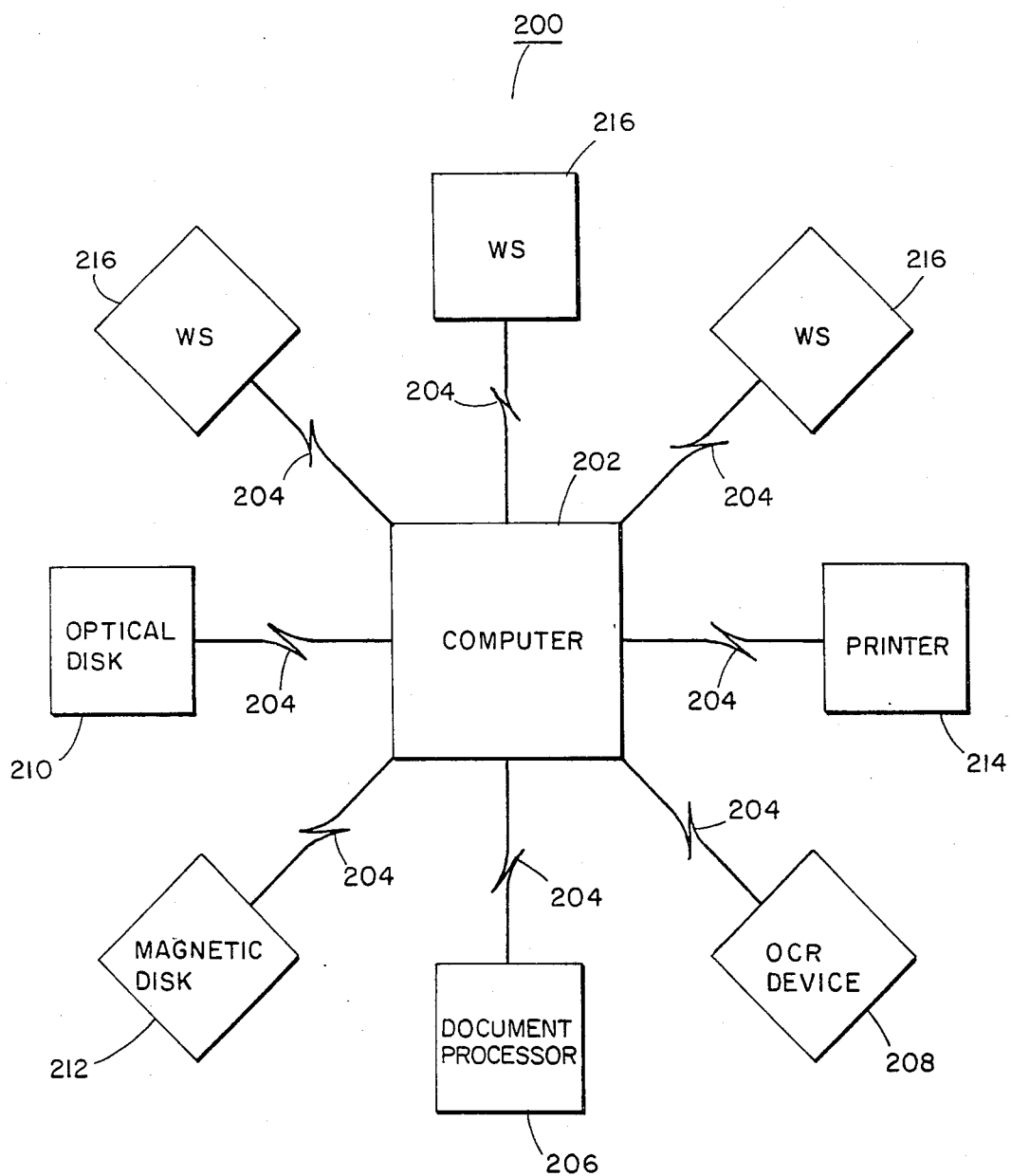
FIG. 2 is a block diagram of a distributed processor version of the digital imaging file processing system in FIG. 1.

FIG. 2 shows a distributed data-processing system or distributed processor system 200 which is functionally equivalent for purposes of the present invention to the system 100 in FIG. 1. The core of the digital imaging file processing system 200 is the computer 202 which contains the system's main processor. The other components of the system 200 are interfaced with the computer 202 and each other with data link means 204. The data link means include hardware and software necessary for the synchronous or asynchronous operation of the components of the system 200. The distributed processor system 200 for the present invention contains a document processor 206, which is identical to the document processor 126 in FIG. 1.

An optical character recognition device or means 208, described infra, is used by the system 200 for character recognition operations using digital images from the document processor 206. Main data storage of the digital images is accomplished using one or more storage means—here, optical disks 210 and one or more magnetic disks 212. Various graphic copies of the stored digital images can be output to a printer 214, used for printing the digital images.

User interaction with and initiation of the system 200 is effected through data linked workstations 216. The system 200 is capable of accepting a number of workstations 216, which are part of the distributed data processing system. In the preferred embodiment the workstations 216 have "intelligent" capabilities, and essentially comprise the following components of the system 100 in FIG. 1: a console or central processing unit 112; a user keyboard 114 and a monitor 120, for the display of information to the user.

Figure 3:
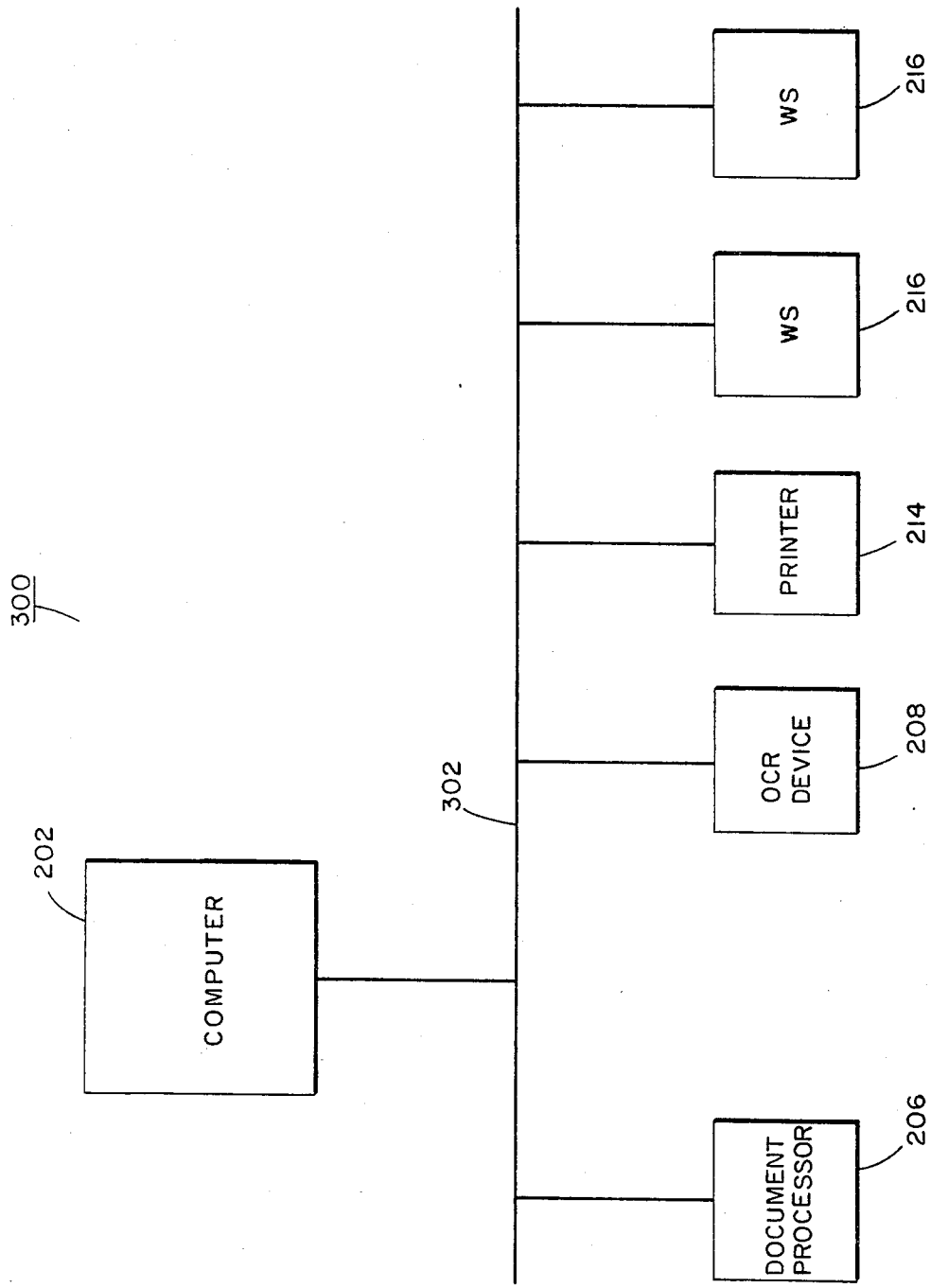
FIG. 3 is a block diagram of system in FIG. 2 implemented with a local area network.

FIG. 3 is an alternate embodiment of the digital imaging file processing system 200 in FIG. 2, implemented using a local area network 302, which connects the major components of the system 200.

Figure 4:
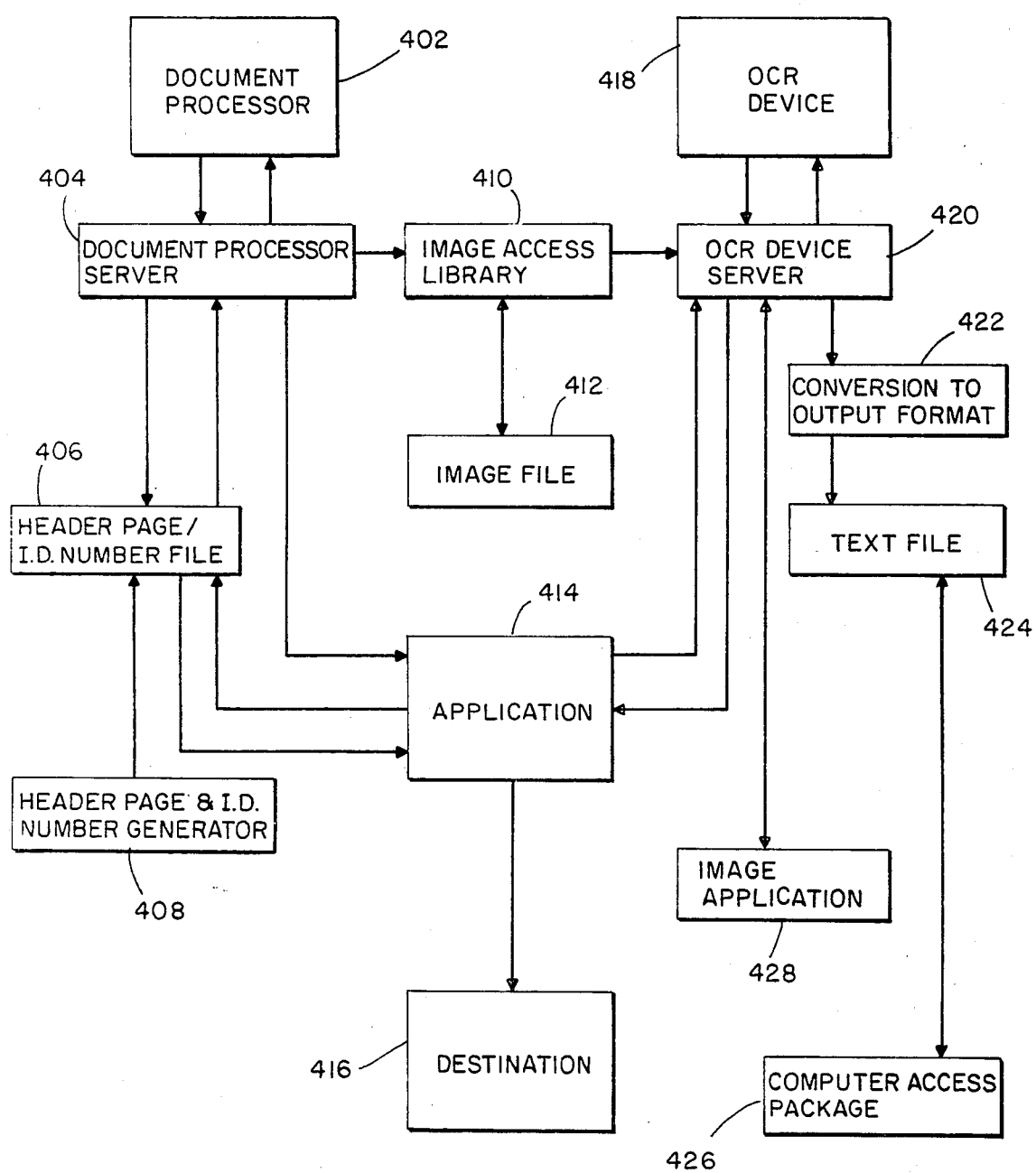
FIG. 4 is a schematic diagram of the digital imaging system encompassing the present invention.

FIG. 4 shows a diagram of the steps involved in processing the documents 102 by the system 200. The digital imaging of a stack of documents begins by loading the documents into the document processor 126, shown in mechanical detail in FIG. 5. In the preferred embodiment, a stack of documents to be digitized will have a header sheet or cover page 600 as shown in FIG. 6. A detailed description of FIG. 4 will be given infra.

The sample header page 600 in FIG. 6 contains a bar code 602 at the top to identify the page and the user. For example, the bar code 602 may represent fourteen unique digits of a code. The bar code is read by the scanner 126 as explained infra. The leftmost two digits may indicate to the document processor 126 that the particular sheet is a header page so that special information about the stack of documents to be processed can be anticipated.

The next eight leftmost digits of the bar code 602 might represent a unique user identification number 616. The user identification number 616 may have many uses. Accordingly, part of the eight-bit code may include code indicating whether a particular user is to have access to the digital imaging file processing system 200. The user identification number 616 is also useful in the classification and storage of the processed documents.

Finally, the bar code input can be used to track user practices such as frequency of operation. That type of information is valuable for billing and security systems.

The last four digits represent a form number 618, indicating which header form the user is employing in the digitizing processing. Many different types of header pages are possible, with each page indicating different kinds of information the document processor 126 is to pay special attention. A decimal numeric representation 604 of the bar code 602 is placed below the bar code 602 for easy identification by the human user.

The sample header page 600 contains four reference lines—two solid horizontal (606 and 608) and two broken vertical (610 and 612)—which serve two purposes. First, by detecting the lines 606–612, the document processor 126 knows that special header page information is to follow. Second, the reference lines 606–612 serve to inform the document processor 126 that special information boxes are located at known distances from the horizontal and/or vertical lines. Once the reference lines 606–612 are detected the document processor 126 scans the information boxes to find those which are shaded. A shaded box indicates a particular option chosen by the user.

In the preferred embodiment the scanner control options are identical for each header page form, regardless of the user. The first three options 622–626 under scanning control options 620 control the scanning resolution. For example, the scanning resolution may be 200, 300 or 400 dots per inch.

The next two option boxes 628 and 630 indicate whether the system is to pay special attention to highlight (yellow) marks in the stack of documents to be processed. The first of the two boxes 628 indicates that no highlight marks are to be read by the system, while the second of the two boxes 630 indicates that the system is to look for and process highlight marks. The highlight mark detection means will be explained infra, with the aid of FIGS. 7 and 8. The last three boxes in the group 632–634 give information about the optical quality of the documents in the group represented by the particular page. If the document or documents in the group are rather faint in nature, the "light original" box 632 is blackened. If the document or documents in the group are dark in nature, the "dark original" box 636 is blackened. Finally, the "normal original" box 634 is blackened if the documents in the group are of normal luminosity. These boxes adjust the scanning circuit and/or algorithms accordingly. The default choices for the boxes under "SCANNER CONTROL OPTIONS", numbered as 620, are indicated by an asterisk. In other words, if the user fails to specify a box in any of the groups of boxes, the system 200 will automatically assume that the default choices are to govern.

The option boxes under the heading "OCR OPTIONS", numbered as 638, are to be included on all header page forms as well as the "SCANNER CONTROL OPTIONS". The boxes under "OCR OPTIONS" control the actuation and manner of operation of the OCR device. The first box, "no OCR" (numbered 640), indicates that the OCR device 208 is not to be used by the system 200 in processing the particular batch or documents. The second box, "OCR on highlight areas only" (numbered 642), indicates to the system 200 that the OCR device is only to be actuated in the confines of yellow highlight marks. This may indicate that the user prefers that only the information appearing as highlighted is to be stored in the form of alphanumeric characters.

If the user desires the entire digitized document(s) to be converted to alphanumeric characters where appearing in the specimen(s) the "OCR entire document" (numbered 644) is blackened. The remaining two boxes 646 and 648 under the "OCR OPTIONS" heading are blackened according to which, if any portion the user desires the OCR device to ignore. If the "delete image" box 646 is blackened the system will only save the text data while disgarding the non-text data after the document is completely processed. The "delete image" box may alternately be defined to mean the OCR will only convert digital data into alphanumeric characters is those areas of the specimen which are classified as primarily textual in nature, while ignoring those areas of the specimen which are classified as primarily photographic.

If the user blackens the "delete text" box 648, the the system will treat the resulting data from the document in a manner opposite to the "delete image" case, above. A method of distinguishing between textual and photographic areas in the digital imaging process is disclosed in U.S. patent application Ser. No. 846,376, filed Mar. 31, 1986. The invention disclosed in that application has been assigned to Wang Laboratories, Inc. of Lowell, Mass., also the assignee of the present invention.

All of the boxes 652–664 under the heading "FILING OPTIONS" (number 650) are unique to the particular header page form being used. The user may create various options under this category to be remembered by the system 200. The "FILING OPTIONS" determine the destination and/or classification of the digitized images. The boxes shown under this heading in FIG. 6 are illustrative.

Figure 5:
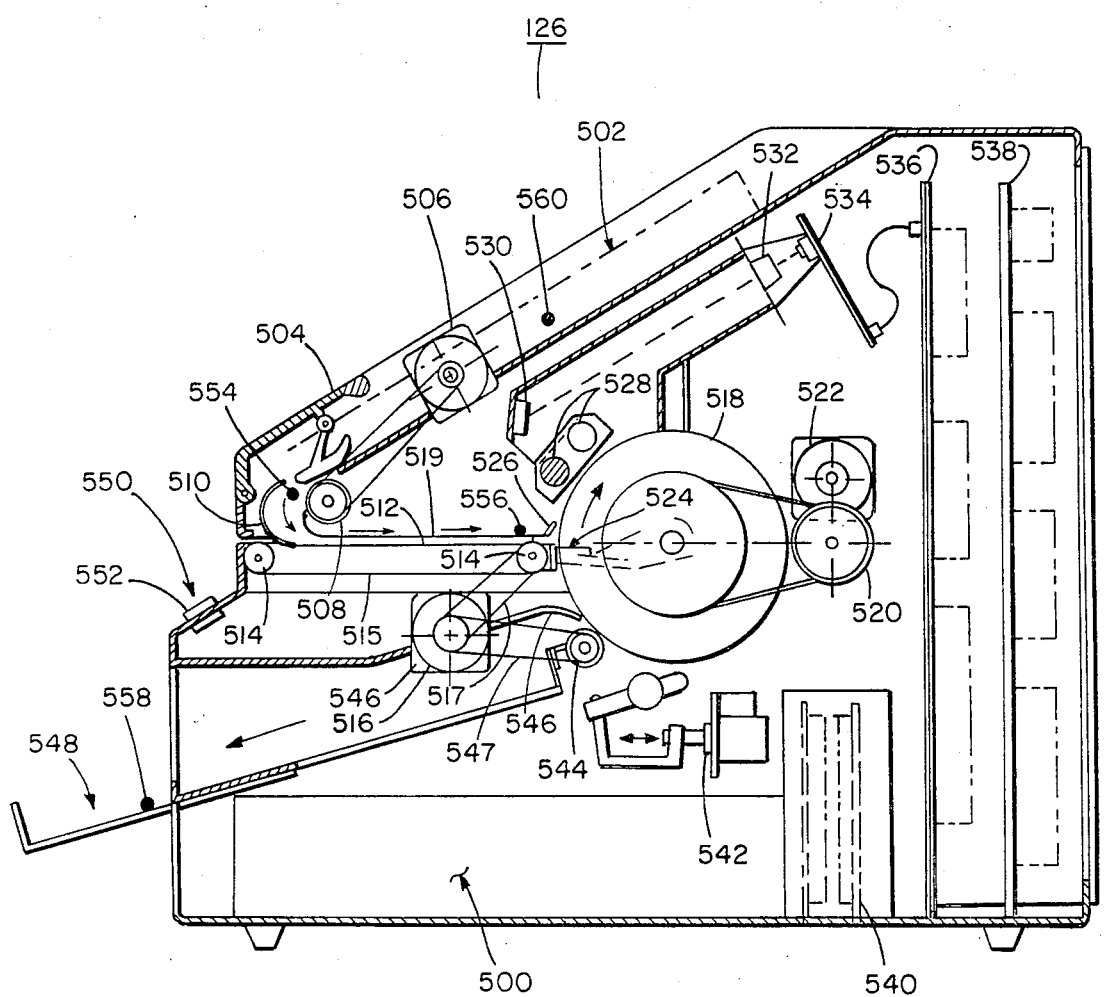
FIG. 5 is a mechanical end view drawing of the document processor first shown in FIG. 1.
Figure 6:
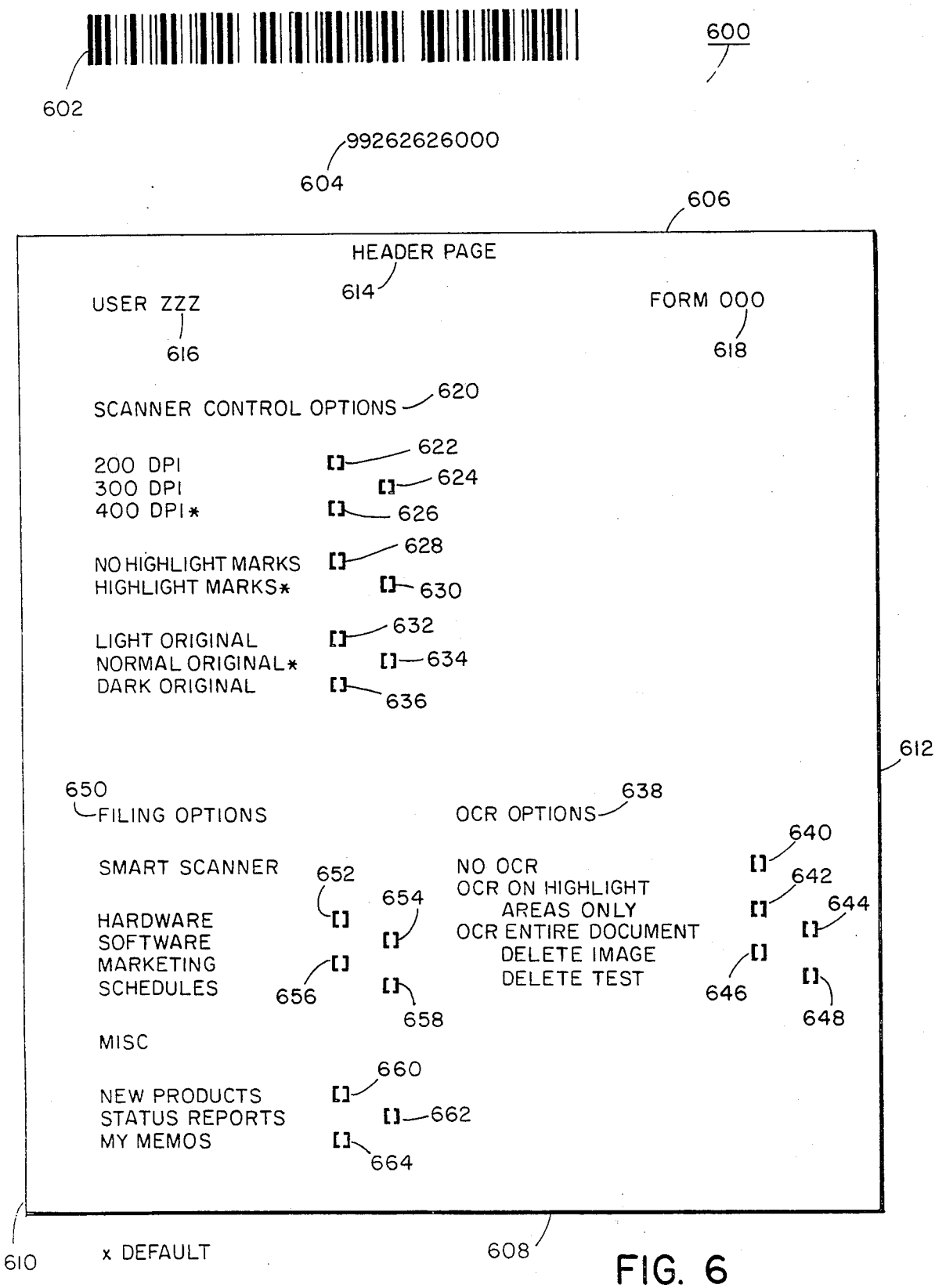
FIG. 6 shows an example of the header or identification page to be used with the present invention.

FIG. 5 will now be described in detail. The document processor 126, powered by a power supply 500, contains a document stack 502 for face-down stacking of a group of documents to be digitized. The document stack 502 is located at an incline to the horizontal so that the documents tend to slide towards the document load lever 504. The document load lever 504 operates such that only the bottom sheet of the documents in the document stack 502 is allowed to pass at one time.

A document feed motor 506 powers a document feed roller 508, which advances the specimen through an elbow column 510 for curving the specimen around to the document alignment mechanism 512. The document alignment mechanism 512 essentially consists of two document alignment rollers 514 surrounded by a band 515. The document alignment mechanism 512 is powered by a drive motor 516 through a belt 517. After the document has been advanced by the document feed roller to the document drum 518, the document alignment mechanism 512 insures that the edges of the document are flush with the outer surface of the document drum 518. The document alignment mechanism 512 corrects any misalignments by sending the document between a document alignment plate 519 and the band 515. The coefficient of friction between the document and the band 515 is greater than the coefficient of friction between the document and the document alignment plate 519, so that the document travels with the movement of the band 515 until the edges of the document reach the document drum 518.

The document drum 518 is rotated by a document drum belt 520 powered by the document drum drive motor 522. A special document clamp 524 is located on the surface of the document drum 518, and is parallel to the axis of the drum. The document clamp 524 possesses a unique biased clutch feature. That is, the document clamp only engages when the document drum is rotated in one direction—clockwise in FIG. 5. Once the document clamp 524 is engaged, it continues to be engaged as long as the document drum 518 rotates in the clockwise direction, or stops rotating. The document clamp 524 is disengaged by a slight counter-clockwise rotation of the document drum 518.

Just before the scanning process begins the document is positioned—with the document feed roller 508 and the the document alignment mechanism 512—inside of the small document clamp 524 until the document is flush with the back of the clamp 524. In practice the depth of the clamp may be very small. In the document receiving mode of the document drum 518 the document clamp 524 is in the disengaged state. The document drum 518 then begins rotating clockwise in FIG. 5, and after a small angle, the document clamp 524 engages and clamps the edge of the document. The clamped document is rotated clockwise past the document illuminators (lamps) 528 during the scanning process. The document maintains contact with the document drum 518 by the clamp 524 and further with the aid of a document press mechanism 526. The document press mechanism may be a simple ledge of resilient material attached to the document alignment plate 519, biased toward contact with the document drum surface. The document press mechanism insures that the document is properly located on the surface of the document drum 518 during scanning.

During the actual scanning of a document the document is illuminated by the document illumination means 528. The resulting image of the document is reflected by a fold mirror 530 to an objective lens 532 for focusing the line image of the document on the linear surface of a charge-coupled device (CCD) array 534. As explained supra, the CCD array converts each scan line of the image into a line of analog voltage levels as the drum rotates the document past the stationary CCD. The image is digitized using digital circuitry on boards 536 and 538 along with the computer 202 of the system 200. The images are further converted into pixels by any of thresholding processes well known in the art. The circuit boards 536 and 538 contain digital hardware as well as "firmware" to accomplish the thresholding/digitizing process.

In addition to outputting signals used in the digitization of the documents, the CCD array 534 also serves as a bar code reader for reading the bar code 602 of the header page 600 in FIG. 6. The various lines comprising the bar code 602 are converted into a unique character string based on the signals output by the CCD array 534 while the bar code 602 is being scanned.

Electronics for the coordination of the various motors in the document processor 126 are contained at location 540. The document is rotated during the scanning process until scanning is complete. A document stamp or solenoid 542 is available to print various error messages on a header page or document. The document is rotated until the document clamp 542 is positioned between an exit roller 544 and an exit wall or stripper plate 546, both resting against the document drum 518, at which point the document drum 518 stops rotating momentarily. The document drum 518 is rotated through a small counter-clockwise angle—enough to disengage the document clamp 524 and release the document.

The coefficient of friction between the document and the exit roller 544 is greater than the coefficient of friction between the document and the document drum 518. Therefore, the exit roller 544, powered by the drive motor 516 through a belt 517 is able to advance the document by a counter-clockwise rotation. With the document free of the clamp, both the exit roller 544 and the document drum 518 are rotated until the leading edge of the document reaches the stripper plate 546 and is forced away from the document drum 518. The stripper plate 546 is located close enough to the exit roller 544 and the document clamp 524 in its disengaged state so that drum must rotate past the exit wall 546 before the documnt clamp 542 again closes. By the time the clamp 524 again closes the leading edge of the document is separated from the the surface of the document drum 518 and is following the stripper plate 546. Consequently, the document is not erroneously re-clamped to the drum 518 by the clamp 524. The exit roller 544 continues forcing the document forward until the document finally lands into the exit tray 548.

The document drum 518 continues its rotation back to the start position for receiving another document. It is then rotated through a small counter-clockwise angle to open its document clamp 524. The document processor 126 is now ready to process another document.

The document processor 126 contains a control panel 550 for limited user interface. Various switches 552–560 are included with the document processor 126. Switch 552 is a job interrupt key for interrupting a current processing job. Switch 554 indicates that a document has begun to be removed from the stack and later that it has moved past the document feed roller 508. Switch 556 indicates that the document is ready to be clamped and scanned. Switch 558 indicates a document overflow—that more documents are in the exit tray 548 than the document processor 126 can handle. Switch 560 indicates whether the width of the documents in the document stack 502 is eight and one-half inches or "A4". In the preferred embodiment the documents in a batch must have the same width.

The method of highlight mark detection shall now be discussed. One use of highlight mark detection in the present invention is to locate specially shaped highlight marks on a document which indicate the title of the document. The digitized version of the document can then be indexed according to title. Another use of the highlight detection method is to indicate key words in the document, which the system 200 will use to further classify and index the digitized document. A third use of highlight marks and highlight mark detection in the present invention is to place and have recognized column separators in a document which the optical character recognition device (or optical character recognition means) 208 will use as references to maintain the original column format of the document to be digitized.

Figure 7:
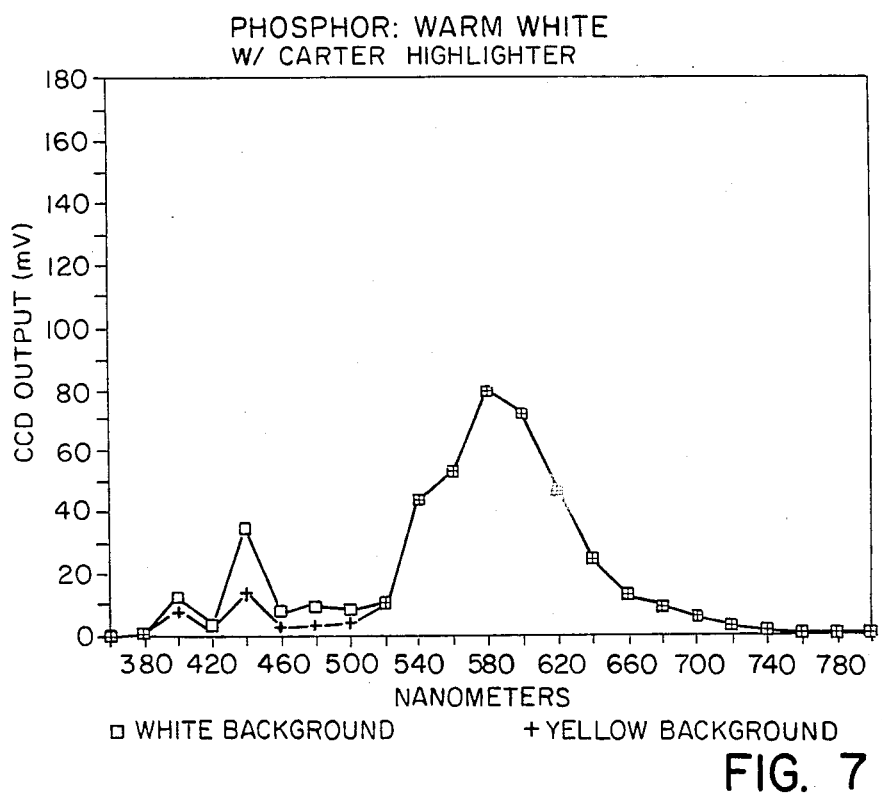
FIG. 7 is a graph of charge-coupled device outputs in millivolts of a document's white background and yellow highlight marks versus the wavelength of illuminating white light.
Figure 8:
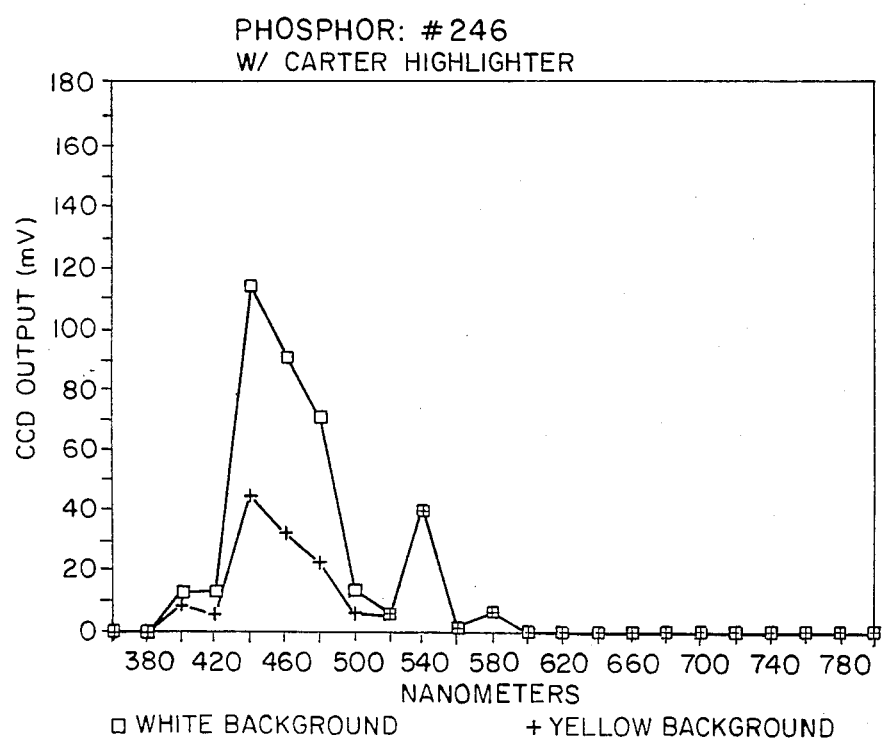
FIG. 8 is a graph of charge-coupled device outputs in millivolts of a document's white background and yellow highlight marks versus the wavelength of illuminating blue light.

Although the particular method of highlight detection discussed below is for yellow highlight marks, the same method can be adapted to detect highlight marks of other colors. FIGS. 7 and 8 represent empirical data about the optical characteristics of yellow highlight marks. From this data generalizations are formed which lead to the method of highlight mark detection in the present invention. The output of the CCD at a single point or pixel of a document is governed by the following equation:

$$O = \int S(k)I(k)R(k)dk \qquad (A)$$

where O is the output in volts, S is the spectral sensitivity of the CCD, I is the spectral illumination and R is the object spectral reflectance. S, I and R are all functions of wavelength, k. In order to facilitate color detection two outputs are needed at a single pixel. If the illumination, I, is properly chosen for the two scans of the pixel under test, the color characteristics of the pixel can be determined by comparing the outputs through what will be generally referred to as an output comparison means (actually an algorithm).

The specimen is first illuminated with white light, which in general contains equal amounts of red, green and blue visible light. Then the specimen is illuminated with blue light, which contains only a component of blue visible light and no components of red and green. A comparison of the two outputs gives an indication of the color of the pixel area. For a white pixel, most of the white illuminating light will be reflected, while in the case of the blue illuminating light the output will be approximately one third of the output for white illuminating light since only blue light is able to be reflected, for the case when the intensity of the blue light source is approximately one third of the illumination of the white light source. In this case the intensity of the blue light or the gain of the illumination system should be increased so that the output O for a white pixel equals that from the white light.

If the pixel under test is yellow, a different result is obtained. When the pixel is illuminated with white light nearly all of the white light or approximately 90 percent is reflected. However, when the pixel is illuminated with blue light most of the illuminating light is absorbed by the yellow background, making the output of the pixel near zero.

The color of the pixel can be determined by a ratio of the second output (using blue illuminating light) to the first output (using white illuminating light). The results of the comparison are shown in the following equation:

$$O_2/O_1 = \begin{cases} 1 \text{ if the background is white} \\ 0 \text{ if the background is yellow} \end{cases} \quad (B)$$

Using equation B all that need be done is divide the outputs to obtain a fraction in order to determine whether the background pixel is white or yellow. However, subtraction is often much easier for digital computers than division (division requires more time than subtraction. It is desirable to use a subtraction method of comparing CCD outputs to ease the computation burden of the arithmetic-logic unit of the document processor. To approximate equation B the preferred embodiment of the present invention subtracts the second output (using blue illuminating light) from the first output (using white illuminating light). The results of the computation are summarized by the following equation:

$$O_1 - O_2 \begin{cases} \approx 0 \text{ if the object is white} \\ >>0 \text{ if the object is yellow} \end{cases} \quad (C)$$

Equation C contains results under ideal or near ideal conditions. This method of approximation is premised on the fact that the second output is nearly equal to the first output when the background is white. Actually, the document processor 126 need only determine whether the difference is near zero or significantly different from zero to determine if the background is respectively, white or yellow. Therefore equation D, below, is used to compute a difference, $\beta$.

$$O_1 - O_2 = \beta \quad (D)$$

If $\beta$ exceeds a chosen threshold value, then the background pixel is determined to be yellow. For example, the threshold value might equal unity. One of the advantages of this method is that gray or dark areas neutral in color are not detected as yellow.

The method of yellow highlight marker detection is actually computed on a cell of pixels at a time rather than single pixels. For example, cell may be a block of 16×16 pixels on a document containing 400 dots per inch per scan line. An average for the entire cell is obtained first using white illuminating light; then an average output using blue illuminating light is obtained. As before in equation D, the second output is subtracted from the first output to obtain a value $\beta$. If $\beta$ is less than the threshold value, the cell is determined to be "white". If $\beta$ is greater than or equal to the threshold value, the cell is determined to be yellow. The cell size is chosen large enough so that if the cell contains all or part of an alphanumeric character, there will be enough surrounding pixels to affect the average output of the cell so that erroneous white/yellow determinations are avoided.

Figure 9:
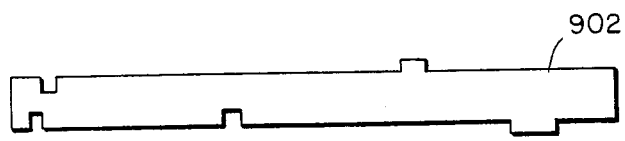
FIG. 9 shows a digital representation of a highlight mark.
Figure 10:
FIG. 10 shows a rectangle assimilation of the highlight mark in FIG. 9.

Referring to FIG. 9, a bit map representation of the yellow marks 902 and their locations within the bit map is then formed. It is desirable to convert those areas 902 determined to be highlighted into rectangles when the bit map representation shows otherwise; i.e., shape 902 is not a rectangle. It is contemplated that all highlighted information should fit into a rectangle varying in dimension. A rectangle assimilation algorithm (or shape assimilation means) is applied to the bit map to obtain rectangles 1002 (as shown in FIG. 10) of the yellow marks. This technique sometimes requires that some cells previously categorized as un-highlighted be re-classified as highlighted, while in other instances a cell classified as highlighted is re-classified as un-highlighted.

Figure 11:
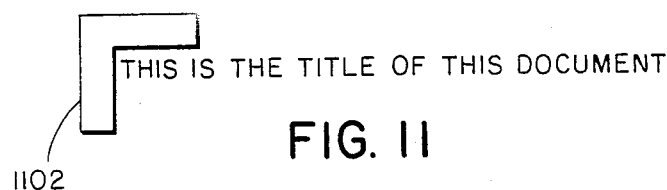
FIG. 11 shows a highlight mark which indicates the title of the document.

After the highlighted cells are assimilated into rectangles, the rectangles are analyzed for their geometric shapes with a shape determination means. The shape determination means is a combination of software designed to search for certain predefined shapes. For example, if a combination of rectangles yields an elbow shaped mark 1102 as in FIG. 11, it is deemed to indicate the presence, for example, of the title of the document. For example, the document processor 126 will determine that the title of the document begins slightly to the right of the vertical leg of the "elbow mark", and slightly below the horizontal leg of the "elbow mark". The title mark is determined by comparing the original highlight mark data with the assimilated rectangle. If a significant portion of the assimilated rectangle was not included in the original highlighted mark, the highlight mark is determined to be an "elbow mark".

Figure 12:
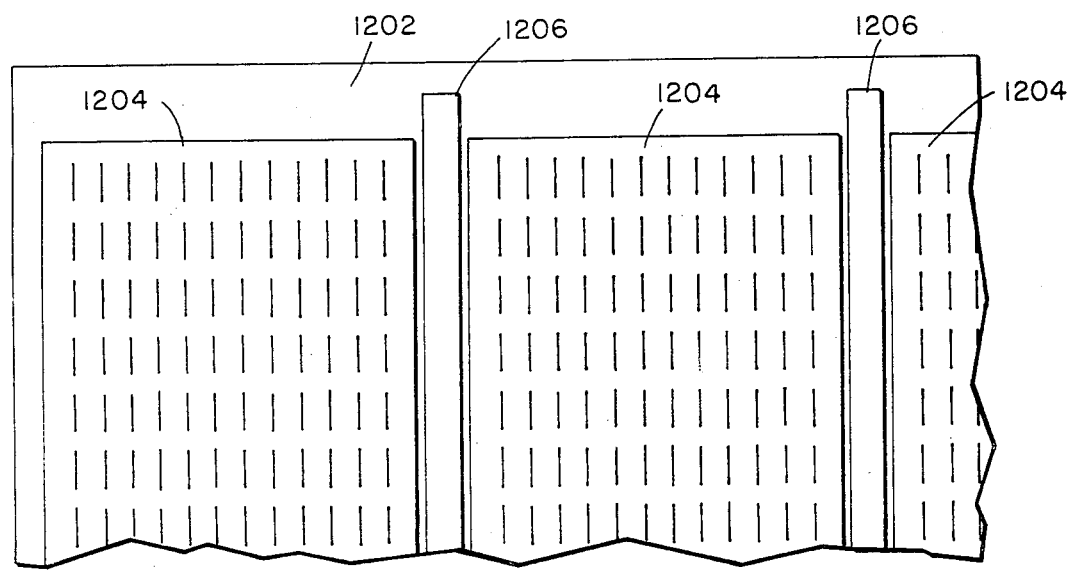
FIG. 12 shows a sample document page with highlight marks serving as column separators.

Another significant rectangle is the horizontal rectangle 1002 in FIG. 10 indicating the presence of a key word within its boundaries. Still another significant rectangle is the long, vertical rectangle 1204 as shown in FIG. 12, which indicates to the OCR device (where OCR operations are to be performed) that the scan lines of a page 1202 are to be separated into columns 1204 beginning and ending at the highlight marks.

Returning now to FIG. 4, the process is started by entering a prospective document to be digitized into the document processor 402; e.g., scanners 106 and 126 in FIG. 1. Before any of the documents in a stack are digitized, the document processor 402 sends the various information from the header page 600 in FIG. 6 to the document processor server 404, a software module. The server 404 includes a bar code reader algorithm for reading the bar code 602 on the top of the header page 600. The document processor server 404 seeks verification of the user identification number 616 listed on the header page 600 by sending the identification number 616 to the header page/identification file 406, a data storage file. If verification is received from the storage file 406, the document processor server 404 continues the digitization process. If verification is not received, the documents are rejected by the document processor 402, and no data from these documents is sent to the computer 202, while the respective header page 600 is marked with the document stamp 542 with "INVALID I.D. NUMBER" or similar message. If the user desires to create a new header page 600 for the system 200 or a new identification, the header page and identification number generator 408, a software module, can be made to generate a new identification number 616 a take cognizance of the new header page 600 being read.

The document processor server 404 sends image data to the image access library 410. The image access library 410 creates a new file for the image data and sends the corresponding image data each time a new header page 600 is indicated by the document processor server 404. The image file 412 contains not only a bit map representation of the documents, but the presence or absence of highlight marks, as well as their shapes and locations. Along with sending the image data to the image access library 410, the document processor server 404 sends the header page form number 618, the boxes specified on the header page 600, the user identification number and the name of the file in the image file 412 where the corresponding image data has been sent to the application software module 414. These items have been stored by the header page/identification number file 406.

The application software 414 makes a query of the header page/identification number file 406 as to what functions to perform. In the present invention a "personal filing system" message instruction is received by the application software 414 from the file 406. This means the filing features of the system 200 explained heretofore are chosen. It is possible for the application software 414 to perform other functions unrelated to the present invention.

The application software 414 sends the image file name, the text file (to be discussed infra) name and the various indexing information, including the title and key words to the destination software 416. The destination software is accessed whenever a document or group of documents is to be available for editing, observation, etc.

The OCR device, shown in FIG. 4 as reference number 418 is controlled by the OCR device server software 420, which serves as an interface between the OCR device 418 and the rest of the system 200. If OCR operations are chosen, the application software 414 sends the image file name of the respective document along with the various OCR options (listed on the header page 600) to the OCR device server 420. The OCR device server 420 sends the image data received from the image access library 410 (received from the file name in the image file 412 indicated to the OCR device server 420 by the application software 414) to the OCR device 418 for character recognition of the data. As the image is being converted by the OCR device 420 text data is sent back to the OCR device server 420 until the conversion process is complete.

The converted data, now in textual form, is converted by a module 422 into a word processing document, such as is compatible with the particular system 200 for word processing. From there the word processing document is stored in an output or text file 424. The word processing document can be accessed by the components of the system 200 via the computer access package 426.

Other applications of the OCR device 418 are possible in the system 200 without the use of the document processor 402 by the image application module 428.

Various modifications and variations of the foregoing described invention are obvious to those skilled in the art. Such modifications and variations are intended to be within the scope of the present invention. The embodiments described are representative of a multitude of variations without changing the essence of the apparatus operation. For example, the user may enter some of the same input information found on a header page, both before and after digitization, through a workstation 212 in FIG. 2. This includes such information as the location, size and shape of highlight marks used to identify title and key words, as well as identification numbers, etc.

We claim:

1. A digital imaging file processing system for processing and filing digitized documents comprising:
    scanner means for scanning and converting a group of input documents into digital image data;
    storage means for storing digital image data; and
    detection means for detecting highlighted areas on the input documents, said detection means further comprising:
        first illumination means for illuminating said input documents with light of a first illumination quality;
        second illumination means for illuminating said input documents with light of a second illumination quality;
        output comparison means which obtains a comparison value from comparing, at each predefined cell of pixels, the difference of potential output of the first illumination means with the difference of potential output of the second illumination means; and
        thresholding means for thresholding at each cell, the result of said output comparison means and determining the presence of highlighting in the cell if the comparison value is greater than or equal to a predefined threshold value, while determining the non-presence of highlighting in the cell if the comparison value is less than the predefined threshold value.

2. The digital imaging file processing system of claim 1 further comprising:
    highlight mark shape assimilation means for assimilating detected highlight marks into a combination of rectangles.

3. The digital imaging file processing system of claim 2 further comprising:
    highlight mark shape determination means for determining the shape of said detected, assimilated highlight marks, whereby the highlighted indicia on the documents are given special treatment by the system according the corresponding highlight mark shape.

4. A digital imaging file processing system for processing and filing digitized documents comprising:
    scanner means for scanning and converting a group of input documents into digital image data;
    storage means for storage digital image data; and
    header page means associated with each group of documents to be digitized for automatically instructing the operation of the system with the use of a coded header page that includes instructions relating to the control of the scanner means, control of the storage means and the use, non-use and nature of use of an optical character recognition device.

5. A digital imaging file processing system for processing and filing digitized documents comprising:
scanner means for scanning and converting a group of input documents into digital image data;
storage means for storing digital image data;
detection means for detecting highlighted areas on the input documents; and
header page means associated with each group of documents to be digitized for automatically instructing the operation of the system with the use of a coded header page.

6. The digital imaging file processing system of claim 3 further comprising:
header page means associated with each group of documents to be digitized for automatically instructing the operation of the system with the use of a coded header page.

7. The digital imaging file processing system of claim 6 wherein said header page includes instructions relating to the control of the scanner means, control of the storage means and the use, non-use and nature of use of an optical character recognition device.

8. The digital imaging file processing system of claim 3 further comprising:
optical character recognition means for converting said digital image data into alphanumeric characters to form text data.

9. The digital imaging file processing system of claim 7 further comprising:
optical character recognition means for converting said digital image data into alphanumeric characters to form text data.

10. A digital imaging file processing system for processing and filing digitized documents comprising:
scanner means for scanning and converting a group of input documents into digital image data, wherein said scanner means includes means for reading bar code information;
storage means for storing digital image data;
detection means for detecting highlighted areas on the input documents.

11. A system for processing documents having highlighting thereon comprising:
scanner means for scanning and converting an input document into digital image data;
storage means for storing digital image data;
detection means for detecting a highlighted area on the input document;
means for determining the shape of the highlighted area; and
control means for controlling document processing such that image data identified by the highlighted area is given special treatment in accordance with the determined shape.

12. The system of claim 11 further comprising means for indexing stored image data according to information on the document identified by the highlighted area, the type of such information being identified by the shape of the highlighted area.

13. A digital imaging file processing system for processing and filing digitized documents comprising:
scanner means for scanning and converting a group of input documents into digital image data;
storage means for storing digital image data;
detection means for detecting highlighted areas on the input documents;
character recognition means for converting image data to character code data; and
means for indexing stored image data according to character code data resulting from application of the character recognition means to image data identified by highlighted areas.

* * * * *